US006968732B2

(12) United States Patent
Nakoji

(10) Patent No.: US 6,968,732 B2
(45) Date of Patent: Nov. 29, 2005

(54) FAILURE DIAGNOSTIC DEVICE OF EVAPORATIVE GAS PURGE CONTROL SYSTEM

(75) Inventor: Yasushi Nakoji, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/788,918

(22) Filed: Feb. 27, 2004

(65) Prior Publication Data

US 2004/0173011 A1 Sep. 9, 2004

(30) Foreign Application Priority Data

Mar. 7, 2003 (JP) ............................. 2003-061956

(51) Int. Cl.[7] ............................................. G01M 15/00
(52) U.S. Cl. ..................................................... 73/118.1
(58) Field of Search ........................... 73/40, 49.7, 116, 73/117.2, 117.3, 118.1

(56) References Cited

U.S. PATENT DOCUMENTS

| | | | | |
|---|---|---|---|---|
| 5,803,055 A * | 9/1998 | Goto et al. | ................. | 123/520 |
| 5,996,400 A * | 12/1999 | Nishioka et al. | ......... | 73/40.5 R |
| 2003/0019481 A1 * | 1/2003 | Kawano | ..................... | 123/520 |

FOREIGN PATENT DOCUMENTS

JP 9-264207 A1 10/1997

* cited by examiner

*Primary Examiner*—Eric S. McCall
(74) *Attorney, Agent, or Firm*—Darby & Darby

(57) ABSTRACT

A state of an energization of a normal open type drain valve interposed between a fresh air introducing port of a canister and a drain filter is checked. And if the valve is not the energized state (open state), the tank internal pressure is checked. If the tank internal pressure is lower than a predetermined value and the state is maintained for a predetermined time, it is determined that the drain valve is close-stuck. If the drain valve is close-stuck, the pressure in the canister becomes negative, and the negative pressure is introduced in a fuel tank via a passage to an atmosphere and a pressure control valve. Closed sticking of the drain valve can be detected by checking the tank internal pressure.

4 Claims, 5 Drawing Sheets

FAILURE DIAGNOSTIC DEVICE OF EVAPORATIVE GAS PURGE CONTROL SYSTEM

The disclosure of Japanese Patent Application No. 2003-061956 filed on Mar. 7, 2003 including the specification, drawings and abstract is incorporated herein by reference in its entirety.

BACKGROUND OF THE INVENTION

1. Field of the Invention

The present invention relates to a failure diagnostic device of an evaporative gas purge control system for diagnosing a presence of a drain valve sticking provided in a fresh air line to a canister.

2. Description of the Related Art

Some engines for vehicles have been provided with an evaporative gas purge control system to feed (or return) an evaporative fuel to an engine intake system and burn thereof in order to prevent an evaporative fuel gas generated in a fuel tank from leaking outside.

Such a kind of the evaporative gas purge control system like this comprises a canister to adsorb the evaporative fuel, an evaporative gas passage to communicate the canister with the fuel tank, and a purge passage to communicate the canister with the engine intake system, allows the evaporative fuel generated in the fuel tank to be adsorbed by the canister, and feeds the evaporative fuel to the engine intake system by utilizing a negative pressure generated in the engine intake system under certain. operating conditions, and burns thereof.

In the evaporative gas purge control system, a leak hole is formed in the evaporative gas purge system leading from the fuel tank to the engine intake system, or when a seal of a joining part of each passage is degraded, the evaporative fuel leaks into the atmosphere from these places, and a failure diagnosis device to check a presence of any leak from the leak hole or the like is added thereto.

For example, in Japanese Unexamined Patent Application Publication No. 9-264207, the evaporative gas purge control system has been disclosed, in which a pressure control valve to maintain the pressure in the fuel tank at a specific value is interposed in an evaporative gas passage to communicate the fuel tank with the canister, and a purge control valve to open and close the purge passage is interposed in the purge passage to communicate the canister with the engine intake system, and a drain valve is disposed in a fresh air introducing port of the canister.

When performing a failure diagnosis in such a known evaporative gas purge control system, first, the drain valve is closed and the pressure control valve is opened while the purge control valve is opened to introduce the negative pressure generated in the engine intake system into the fuel tank to set the pressure in the fuel tank to be negative. Then, the purge control valve is closed, a passage from the fuel tank to the purge control valve is closed, and a pressure rise in the fuel tank is measured in thereof state.

The presence of any evaporative fuel leakage in the evaporative gas purge system is determined on the basis of the degree of pressure changes calculated in accordance with the difference between the pressure in the fuel tank measured immediately after the purge control valve is closed (hereinafter, referred to as "tank internal pressure") and the tank internal pressure after an elapse of a predetermined time.

The pressure control valve interposed in the evaporative gas passage is provided to maintain the pressure in the fuel tank at the specific value, and to prevent any abnormal drop of the tank internal pressure by the negative pressure from the engine intake system during the evaporative gas purge control.

Therefore, the pressure control valve comprises a valve chamber interposed in the evaporative gas passage, a reference pressure chamber communicated with the atmosphere, a diaphragm having a valve element fixed to demarcate (or separate) the chambers and open and close the valve chamber, and a diaphragm spring disposed on the reference pressure chamber to press (or push) the diaphragm for a closing direction, and further comprises a so-called diaphragm valve in which the valve element is opened if the tank internal pressure is higher than a resultant force of the atmospheric pressure flowing into the reference pressure chamber and a diaphragm spring force, and the evaporative fuel generated in the fuel tank is adsorbed by the canister.

However, since a reference pressure chamber of the pressure control valve is opened to the atmosphere, the evaporative fuel leaking into the reference pressure chamber can be discharged outside.

In this case, a discharge of the evaporative fuel from the reference pressure chamber can be prevented by communicating the reference pressure chamber with the canister, and allowing the evaporative fuel leaking to the reference pressure chamber side to be adsorbed by the canister.

However, if the fresh air communicating port of the pressure control valve is communicated with the canister, the internal pressure in the canister is introduced in the reference pressure chamber. Therefore, if the drain valve to open/close, for example, the fresh air introducing port is close-stuck, the low internal pressure in the canister is introduced into the reference pressure chamber during the evaporative gas purge control, the diaphragm is attracted to the reference pressure chamber side, and the pressure control valve is opened. As a result, the evaporative fuel in the fuel tank is sucked into the canister side, and the tank internal pressure is considerably dropped.

When the tank internal pressure is dropped, the tank internal pressure can not be raised to a start pressure of the diagnosis during regular failure diagnosis for performing a leak determination of the evaporative gas purge system, failure chances of the diagnosis are reduced, and the diagnosis accuracy is degraded.

For example, the above Japanese Unexamined Patent Application Publication has disclosed a technology to perform the failure diagnosis to check the presence of any closed sticking of the drain valve after the failure diagnosis to check the presence of any evaporative fuel leakage in the evaporative gas purge system.

In other words, after completing the leak determination in the evaporative gas purge system, the drain valve is opened from this state, the pressure control valve is closed, and measured is the pressure rise of the tank internal pressure in the state. If the rate of this pressure rise is smaller than a reference rate, it is determined that the drain valve is close-stuck.

Further, the pressure control valve has a reed valve to be opened when the pressure on the canister side is higher than the pressure on the fuel tank side. Because the atmospheric pressure is introduced by a pressure difference in the fuel tank via the reed valve if the drain valve is normally opened, the pressure in the fuel tank is raised in a relatively earlier stage. On the other hand, when the drain valve is close-stuck, little differential pressure is caused between the fuel tank side and the canister side. Therefore, no pressure is introduced from the canister side to the fuel tank side, and the tank internal pressure is raised only by the pressure corresponding to the fuel evaporation. The pressure is raised less, and in such a case, it is determined that the drain valve is close-stuck.

However, as described above, if the reference pressure chamber of the pressure control valve is communicated with the canister, the tank internal pressure is considerably dropped during the evaporative gas purge control, and chances for an ordinary failure diagnosis to check the presence of any evaporative fuel leakage are reduced. Further, the chances for the failure diagnosis to check any closed sticking of the drain valve are also reduced, and as the result, a detection accuracy of the failure diagnosis is degraded.

SUMMARY OF THE INVENTION

Accordingly, it is an object of the present invention to provide a failure diagnostic device of an evaporative gas purge control system for improving a determination accuracy of failure diagnosis with a simple structure without largely changing a structure of a pressure control valve, and enhancing a reliability of a product.

The failure diagnostic device of the evaporative gas purge control system of the present invention comprises a fuel tank, an evaporative gas passage to communicate the fuel tank with a canister to adsorb an evaporative fuel generated in the fuel tank, a purge passage to communicate the canister with an engine intake system, a pressure control valve interposed in the evaporative gas passages and opened at a valve opening hole according to a pressure difference between the pressure in the fuel tank and a reference pressure if the pressure in the fuel tank is higher than the reference pressure, purge control means interposed in the purge passage to control opening and closing of the purge passage, a drain valve to open and close a fresh air introducing port opened in the canister, and tank internal pressure detecting means to detect the pressure in the fuel tank, with a reference pressure chamber to set the reference pressure of the pressure control valve communicated with the canister, and further comprises diagnosis start means to detect that the drain valve is opened from an energized state of the drain valve, and to open the purge control means, and failure determination means to compare the pressure in the fuel tank detected by the tank internal pressure detecting means with a closed sticking determination pressure of the drain valve, and to determine a closed sticking of the drain valve if the pressure in the fuel tank is lower than the closed sticking determination pressure of the drain valve.

In this configuration, the presence of any closed sticking of the drain valve is performed separately from a regular failure diagnosis to check the presence of any evaporative fuel leakage in the evaporative gas purge system. Accordingly, the determination accuracy in the regular failure diagnosis is improved, and the reliability of products is enhanced.

The above and other objects, features and advantages of the invention will become more clearly understood from the following description by referring to the accompanying drawings.

DESCRIPTION OF THE PREFERRED EMBODIMENTS

Figure 1:
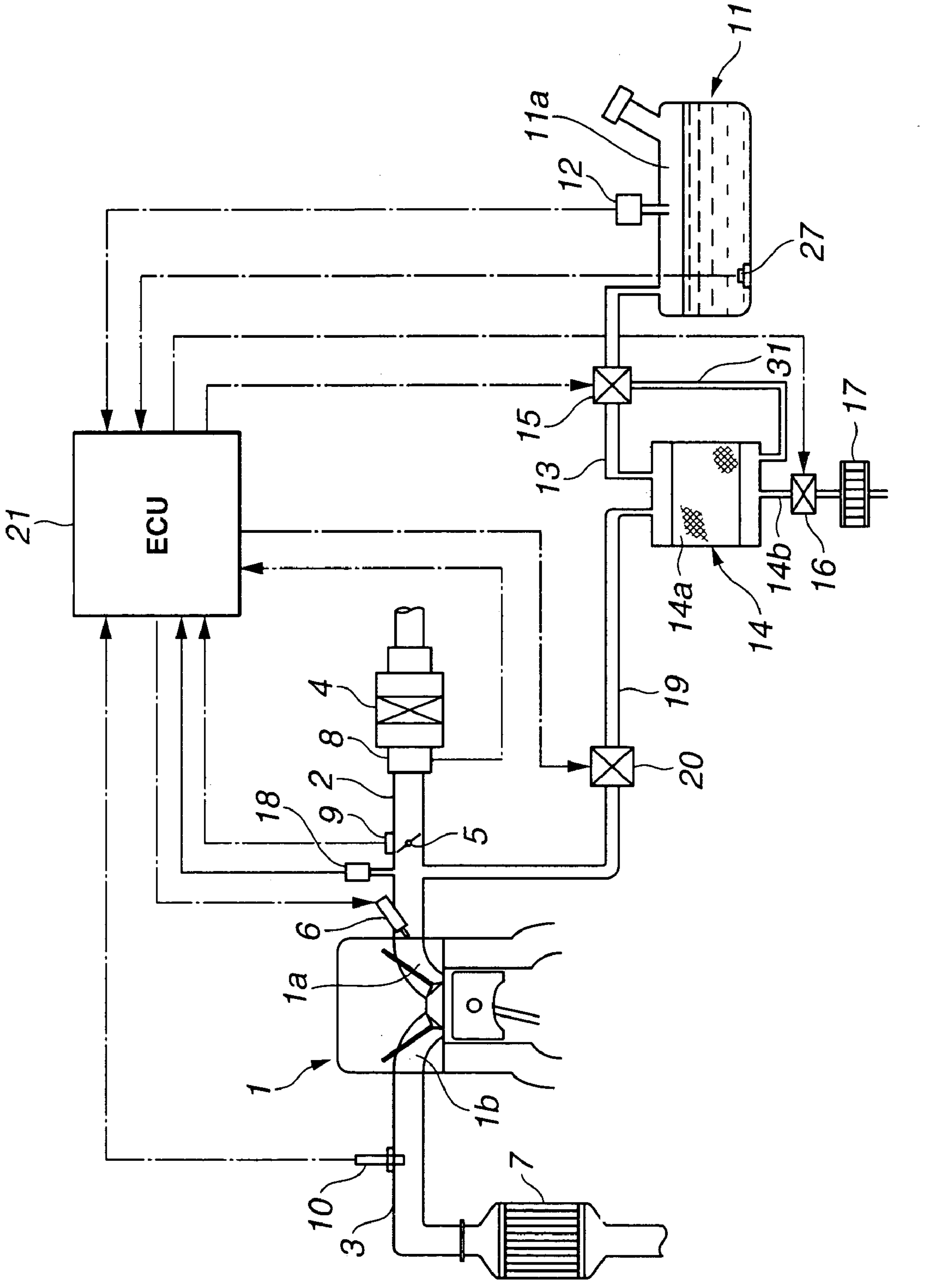
FIG. 1 is a block diagram of an evaporative gas purge control system.

An embodiment of the present invention will be described below with reference to attached drawings. Reference numeral 1 in FIG. 1 denotes an engine, and an air intake passage 2 and an exhaust passage 3 are communicated with an intake port 1*a* and an exhaust port 1*b* of this engine 1, respectively. An air cleaner 4 is disposed on the upstream side of the air intake passage 2, a throttle valve 5 is disposed on the downstream side thereof, and a fuel injector 6 is disposed immediately on the upstream side of an intake port 1*a*. In addition, a catalyst 7 is interposed in the middle of the exhaust passage 3, and communicated with an exhaust muffler (not shown). Reference numerals 8, 9 and 10 denote an air flow sensor, a throttle opening sensor, and an oxygen sensor to detect the oxygen concentration in an exhaust gas, respectively.

Reference numeral 11 denotes a fuel tank, a fuel stored in this fuel tank 11 is communicated with the fuel injector 6 via a fuel passage (not shown), the fuel measured to a predetermined amount is injected from the fuel injector 6 into a combustion chamber, and an excess fuel is returned to the fuel tank 11.

A fuel tank pressure sensor 12 as a tank internal pressure detector is communicated with an upper space 11*a* of the fuel tank 11, and a fuel temperature sensor (or thermometer) 27 to detect a fuel temperature is disposed on a bottom part (or portion). The fuel tank pressure sensor 12 is a kind of strain gage to measure the tank internal pressure P [mmHg] from a pressure difference (relative pressure) between the atmospheric pressure and the absolute pressure in the upper space 11*a* of the fuel tank 11, and the fuel temperature sensor 27 is fixed to, for example, an in-tank type fuel pump (not shown).

The fuel tank 11 is communicated with a canister 14 via an evaporative gas passage 13, and the canister 14 is communicated with the air intake passage 2 on the downstream side of the throttle valve 5 which is an engine intake system via a purge passage 19. An intake manifold pressure sensor 18 to detect the intake manifold pressure by the pressure difference (relative pressure) between the atmospheric pressure and the absolute pressure of the intake manifold is communicated with the air intake passage 2 on the downstream side of this throttle valve 5.

Further, an active charcoal 14*a* as an adsorbent is fitted in the canister 14, and a fresh air introducing port 14*b* is opened. A drain filter 17 is interposed in the fresh air introducing port 14*b*, and a drain valve 16 is interposed between the drain filter 17 of the fresh air introducing port 14*b* and the canister 14. The drain valve 16 is a normal open type, and closed by a drive signal outputted from an engine control unit (ECU) 21 when performing a failure diagnosis which will be described below.

A pressure control valve 15 is interposed in the evaporative gas passage 13, and a purge control valve 20 as purge control means is interposed in the purge passage 19. The purge control valve 20 is a normal close type, and opened by a drive signal output from the ECU 21 during a purge control or the diagnosis.

Figure 2:
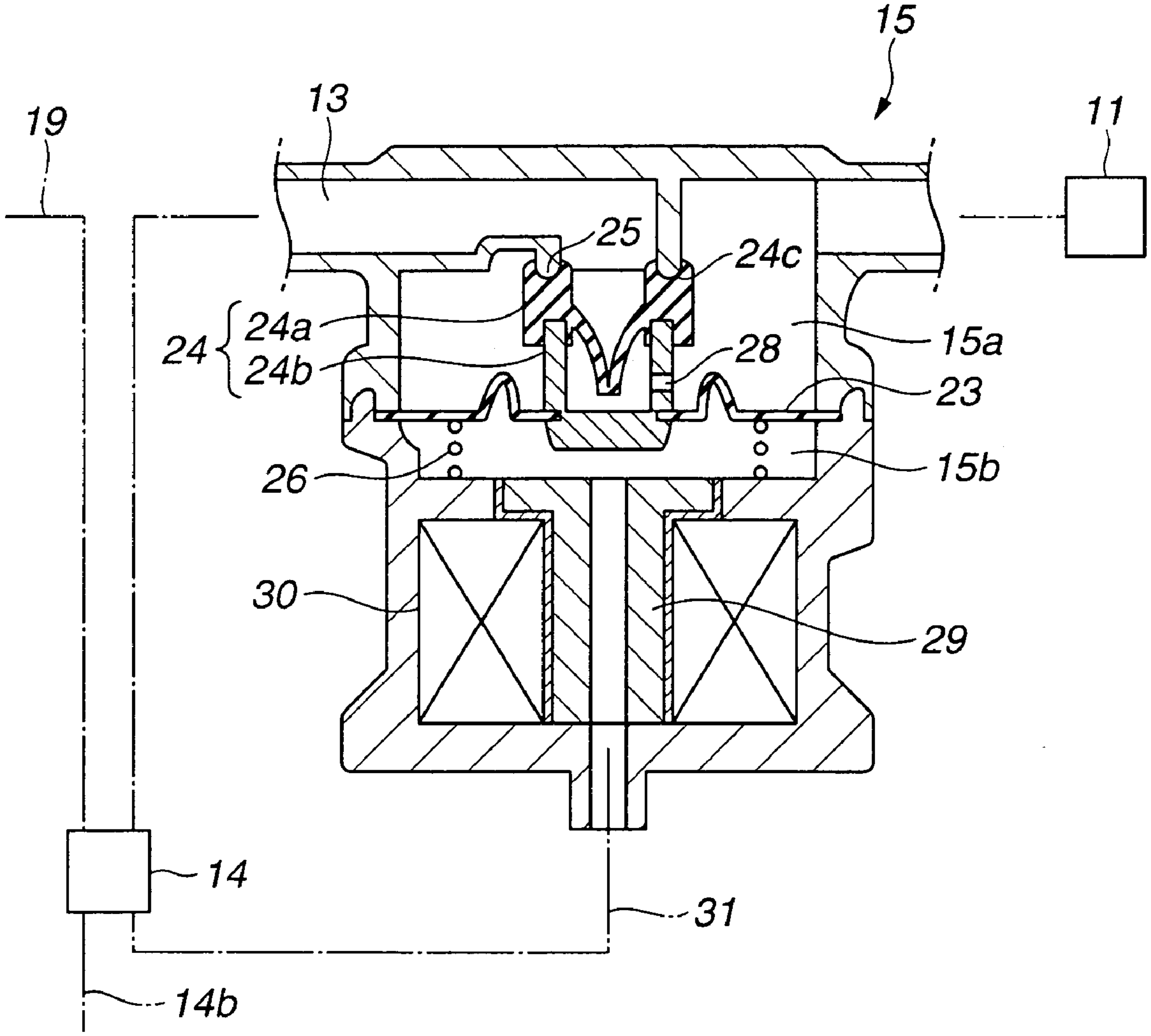
FIG. 2 is a sectional view of a pressure control valve.

The pressure control valve 15 prevents an abnormal drop of the tank internal pressure P [mmHg] during the evaporative gas purge control, and maintains the tank internal pressure P at a substantially constant value. As shown in FIG. 2, the pressure control valve 15 comprises a valve chamber 15*a* interposed in the evaporative gas passage 13, a reference pressure chamber 15*b*, a diaphragm 23 to demarcate the chambers 15*a* and 15*b*, and a valve element 24 fixed to a center of the diaphragm 23, and the valve element 24 faces a valve seat 25 formed in a port end part communicated with the canister 14 side.

The valve element 24 comprises a cylindrical body 24*a* formed of a magnetic material with an upper part opened, and a reed valve 24*b* having a seating surface 24*c* which is fitted to an upper end of the body 24*a* and seated on the valve seat 25 on an outer circumference thereof. The reed valve 24*b* is disposed in a direction in which the valve is opened if the pressure on the canister 14 side is higher than the pressure on the fuel tank 11 side, and closed otherwise, and a discharge port 28 to release the pressure discharged from the reed valve 24*b* to the fuel tank 11 side is formed in the valve element 24.

A fixed core 29 is provided on a side of the reference pressure chamber 15*b* facing the body 24*a*, and a coil 30 is disposed around the fixed core 29. The coil 30 is electromagnetically excited by a drive signal from the ECU 21. In addition, the reference pressure chamber 15*b* is communicated with the fresh air introducing port 14*b* side of the canister 14 via an atmosphere channel 31. The atmosphere channel 31 is formed substantially in a center of the fixed core 29.

In a state that the coil 30 is demagnetized, a seating surface 24*c* formed on an outer circumference of the reed valve 24*b* is seated on the valve seat 25 by an urging force of a diaphragm spring 26 to close the evaporative gas passage 13. on the other hand, if the coil 30 is excited, the valve element 24 is attracted by the fixed core 29, the seating surface 24*c* is separated from the valve seat 25, the evaporative gas passage 13 is forcibly opened, and a passage 31 to atmosphere opened in the fixed core 29 is closed by the body part 24*a* of the valve element 24. The valve element 24 is normally closed, and opened if the tank internal pressure P is increased, and higher than the resultant force of the pressure in the reference pressure chamber 15*b* and the urging force of the diaphragm spring 26 to release the evaporative fuel filled in the fuel tank 11 to the canister 14, and the tank internal pressure P is maintained at a substantially constant value.

Opening and closing operations of the pressure control valve 15, the drain valve 16 and the purge control valve 20 are controlled when the ECU 21 performs an evaporative gas purge control and the failure diagnosis of the evaporative gas purge system.

The evaporative gas purge control is performed at each predetermined period after the engine 1 is started. First, it is checked on the basis of an operating condition whether or not an evaporative gas purge condition is satisfied. If the evaporative gas purge condition is satisfied, a valve opening signal is output to the purge control valve 20, thereby performing a valve opening operation. Then, a negative pressure on the downstream side of the throttle valve 5 is introduced into the canister 14, fuel particles adsorbed in the active charcoal 14*a* are removed by the air introduced from the fresh air introducing port 14*b*, and a purge gas containing the removed fuel particles is sucked into the air intake passage 2 on the downstream side of the throttle valve 5 via the purge passage 19, and fed to the combustion chamber and burned.

In addition, a part of the negative pressure flowing into the canister 14 is introduced into the reference pressure chamber 15*b* of the pressure control valve 15 via the atmosphere channel 31, and an evaporative fuel leak into the reference pressure chamber 15*b* is adsorbed by the activated charcoal 14*a* provided in the canister 14. As a result, the evaporative fuel leaking into the reference pressure chamber 15*b* is not discharged outside, and the discharge of the evaporative fuel to the outside can be zero or brought closer to zero.

On the other hand, in the failure diagnosis for leak determination of the evaporative gas purge system, first, the purge control valve 20 is opened, the coil 30 of the pressure control valve 15 is excited to forcibly open the pressure control valve 15, and further close the drain valve 16. The evaporative gas purse system from the fuel tank 11 to the air intake passage 2 on the downstream side of the throttle valve 5 is maintained in a negative pressure. After the tank internal pressure P detected by the fuel tank pressure sensor 12 is dropped to a predetermined value, the purge control valve 20 is closed to maintain a system from the fuel tank 11 to the purge control valve 20 to be a closed space. Any pressure changes in the closed space is monitored on the basis of the tank internal pressure P detected by the fuel tank pressure sensor 12 to check whether or not a leak hole or the like is formed in accordance with the increasing degree of the tank internal pressure P.

If the reference pressure chamber 15*b* of the pressure control valve 15 is communicated with the canister 14 via the atmosphere channel 31, and a closed sticking occurs because of any defective operation of the drain valve 16 interposed in the fresh air introducing port 14*b* of the canister 14, or stuffed dusts, the pressure in the canister 14 becomes negative if the purge control valve 20 is opened during the above evaporative gas purge control, the pressure applies to the reference pressure chamber 15*b* of the pressure control valve 15 via the atmosphere channel 31. Therefore, the pressure in the reference pressure chamber 15*b* becomes negative, the diaphragm 23 is attracted against the urging force of the diaphragm spring 26, and the valve element 24 fixed to the diaphragm 23 is opened.

As the result, the fuel tank 11 is evacuated, and the tank internal pressure P is constantly negative at least during the evaporative gas purge control.

During the failure diagnosis to perform any leak determination of, for example, the evaporative gas purge system when the drain valve 16 is in a closed sticking state, the purge control valve 20 is closed, and the negative pressure is confined in the evaporative gas purge system between the purge control valve 20 and the pressure control valve 15. In this state, the increasing rate of the tank internal pressure P detected by the fuel tank pressure sensor 12 disposed in the fuel tank 11 is measured to determine a diagnosis start condition. In an initial stage of the diagnosis start condition, the initial tank internal pressure P is considerably dropped, it takes relatively long before the tank internal pressure P is raised to a diagnosis start pressure, and a chance of the failure diagnosis is relatively decreased.

Accordingly, in the present embodiment, a judgement accuracy of the normal failure diagnosis to perform the leak determination of the evaporative gas purge system is enhanced by performing the failure diagnosis for checking the presence of any closed sticking of the drain valve 16, and detecting the closed sticking of the drain valve, separately from the failure diagnosis for performing leak determination of the evaporative gas purge system.

Figure 3:
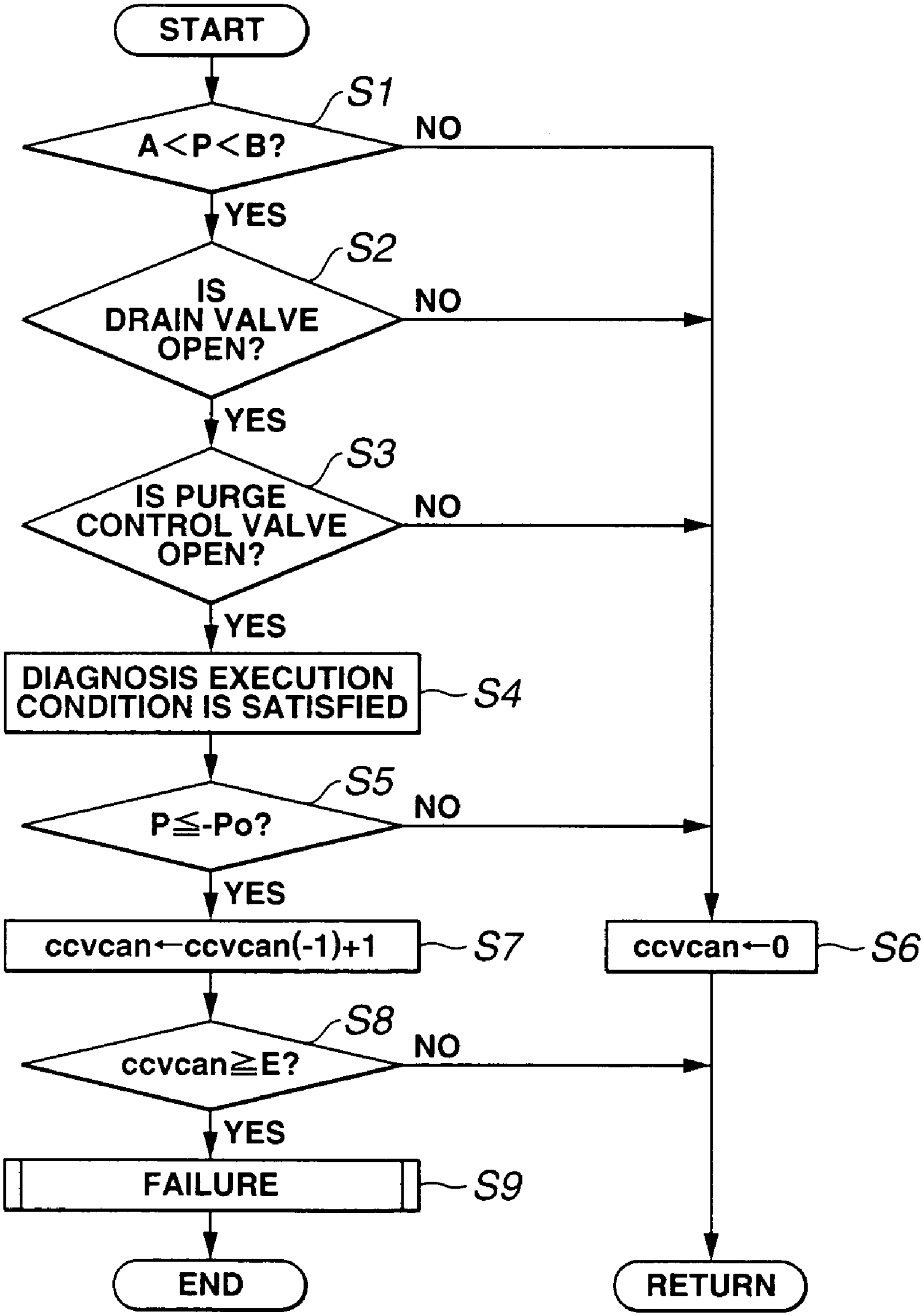
FIG. 3 is a flowchart to indicate a closed sticking diagnostic routine of a drain valve.
Figure 4:
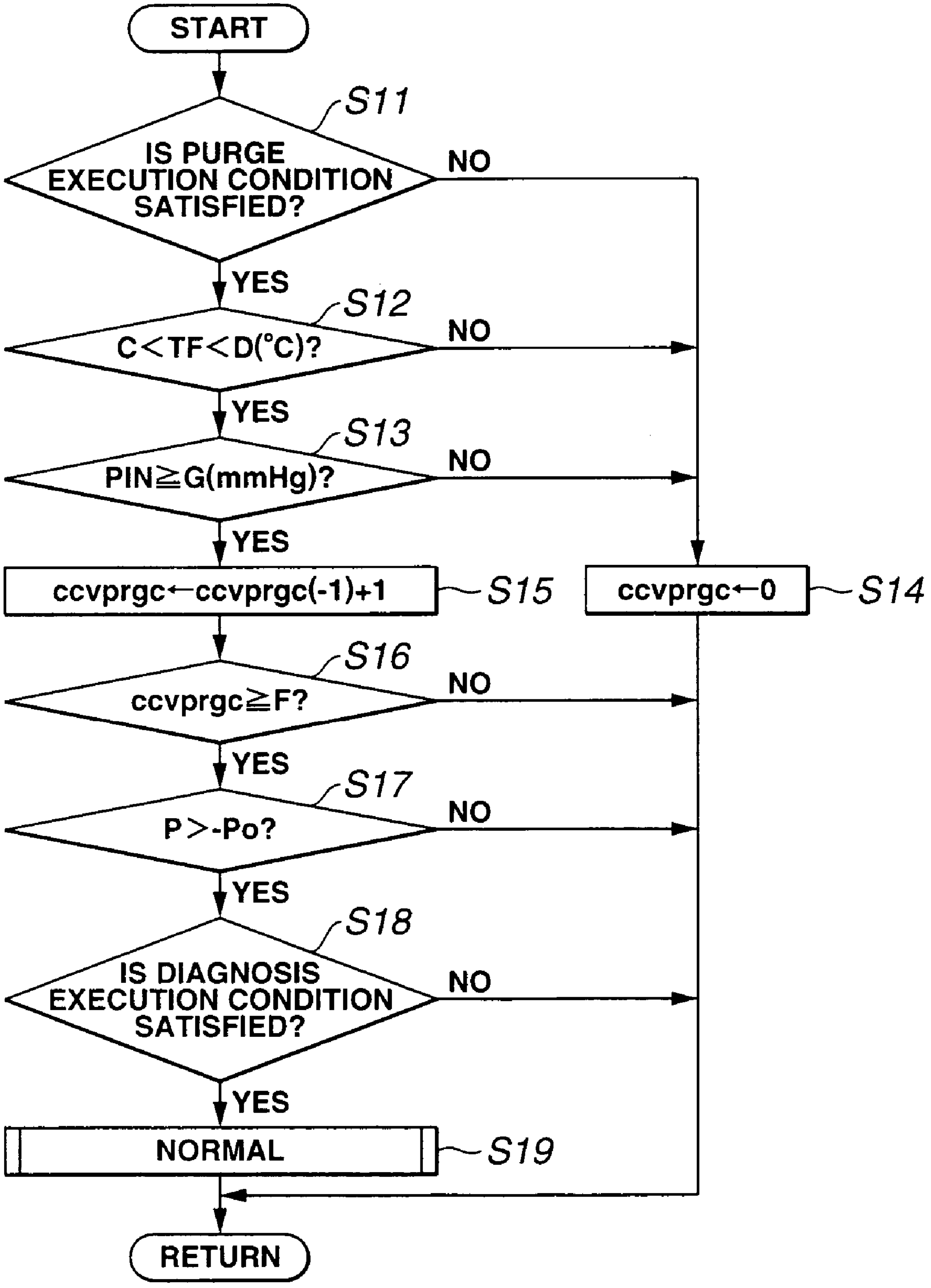
FIG. 4 is a flowchart to indicate a normal condition diagnostic routine of the drain valve.

The failure diagnosis includes a routine to determine the closed sticking of the drain valve 16 shown in FIG. 3, and the routine to determine that the drain valve 16 shown in FIG. 4 is in a normal state.

As shown in FIG. 3, in the routine to check any closed sticking of the drain valve 16, first determine the tank internal pressure condition whether or not the tank internal pressure P (relative pressure) [mmHg] at the start is within a range of a preset tank internal pressure in step S1 by comparing the tank internal pressure P at the start, the lower limit set value A [mmHg], and the upper limit set value B [mmHg], and if A<P<B, it determines that the tank internal pressure condition is satisfied, and go to step S2. On the other hand, if P≦A, or B≦P, it determines that the tank internal pressure condition is not satisfied, jumps to step S6, clear a failure measurement timer ccvcan which will be described below (ccvcan←0), and skips the routine.

The lower limit set value A and the upper limit set value B are used to check whether or not the tank internal pressure P at the start is within a certain positive pressure area, and obtained from an experiment or the like in advance, and set. Even when the drain valve 16 is already closed-stuck at the start, the purge control valve 20 is closed, and no negative pressure is introduced in the fuel tank 11.

At step S2, it checks whether or not the drain valve 16 is opened on the basis of whether or not a drive signal is not energized from the ECU 21 to the drain valve 16, and if the drive signal is not energized, it determines that the drain valve 16 is opened, and it goes to step S3. On the other hand, if the drive signal is energized, it determines that the drain valve 16 is closed, jumps to step S6, clears the failure measurement timer ccvcan which will be described below (ccvcan←0), and skips the routine.

In step S3, it checks whether or not the purge control valve 20 is opened based on whether or not the drive signal is energized from the ECU 21 to the purge control valve 20, and if the drive signal is energized, determine that the purge control valve 20 is opened, and it goes to step S4. On the other hand, if the drive signal is not energized, it determines that the purge control valve 20 is closed, jump to step S6, it clears the failure measurement timer ccvcan which will be described below (ccvcan←0), and skips the routine.

In step S4, it checks that the tank internal pressure P at the start satisfies A<P<B, and is not in an energized state to the drain valve 16 and is in the energized state to the purge control valve 20. It determines that the diagnosis condition is satisfied, goes to step S5, compares the tank internal pressure P with a drain valve closed sticking determination pressure −Po, and if P>−Po, it advances to step S6, clears a failure measurement timer ccvcan (ccvcan←0), and skips the routine. On the other hand, if P≦−Po, it goes to step S7.

The drain valve closed sticking determination pressure −Po is a value when the valve element 24 is opened, and the negative pressure is introduced in the fuel tank 11 by the negative pressure introduced in the reference pressure chamber 15*b* of the pressure control valve 15 if the drain valve 16 is subjected to the closed sticking, and for example, −Po=−30 [mmHg], and preset by an experiment or the like in advance.

For example, if the drain valve 16 is normally opened, the atmosphere is introduced in the canister 14 via the fresh air introducing port 14*b*. Since the atmospheric air pressure is introduced in the reference pressure chamber 15*b* of the pressure control valve 15 via the atmosphere channel 31, the valve element 24 fixed to the diaphragm 23 is closed under the urging force of the diaphragm spring 26, and the tank internal pressure P is maintained so as to satisfy a state of P≧−Po.

On the other hand, when the purge control valve 20 is opened if the drain valve 16 is in a closed sticking state by a malfunction thereof or dust stuffing though the drive signal is not an energized one to the normal open type drain valve 16, the pressure in the canister 14 becomes negative, and the negative pressure is introduced to the reference pressure chamber 15*b* of the pressure control valve 15 via the passage 31.

When the diaphragm 23 is attracted against the diaphragm spring 26, the valve element 24 fixed to the diaphragm 23 is opened, the negative pressure is introduced to the fuel tank 11 via the evaporative gas passage 13, and the tank internal pressure P is gradually dropped.

When the tank internal pressure P indicates a lower value lower than the preset negative pressure −Po (P≦−Po), it goes to step S7, starts counting by the failure measurement timer ccvcan, and make increment of the failure measurement timer ccvcan (ccvcan←ccvcan (−1)+1, where, ccvcan (−1) is a previous value).

Then, it goes to step S8, compares the value of the failure measurement timer ccvcan with a failure determination time E [ms], and if ccvcan<E, it skips the routine, and goes to step S4 via steps S1 to S3 when executing the next routine. If it is determined that the diagnosis execution condition is satisfied, and the tank internal pressure P indicates P≦−Po in step S5, it makes an increment of the failure measurement timer ccvcan again in step S7.

If ccvcan ≧E in step S8, it determines that the drain valve 16 is close-stuck by defective operations thereof or the dust stuffing, it goes to step S9, executes a failure determination processing, and ends the routine.

The failure determination processing executed in step S9 sets, for example, a failure determination flag (not shown), stops the evaporative gas purge control, lights or flashes a warning lamp provided in an instrument panel or the like, indicates a driver any failure of the evaporative gas purge system or any closed sticking of the drain valve 16, and stores a corresponding trouble code.

Figure 5:
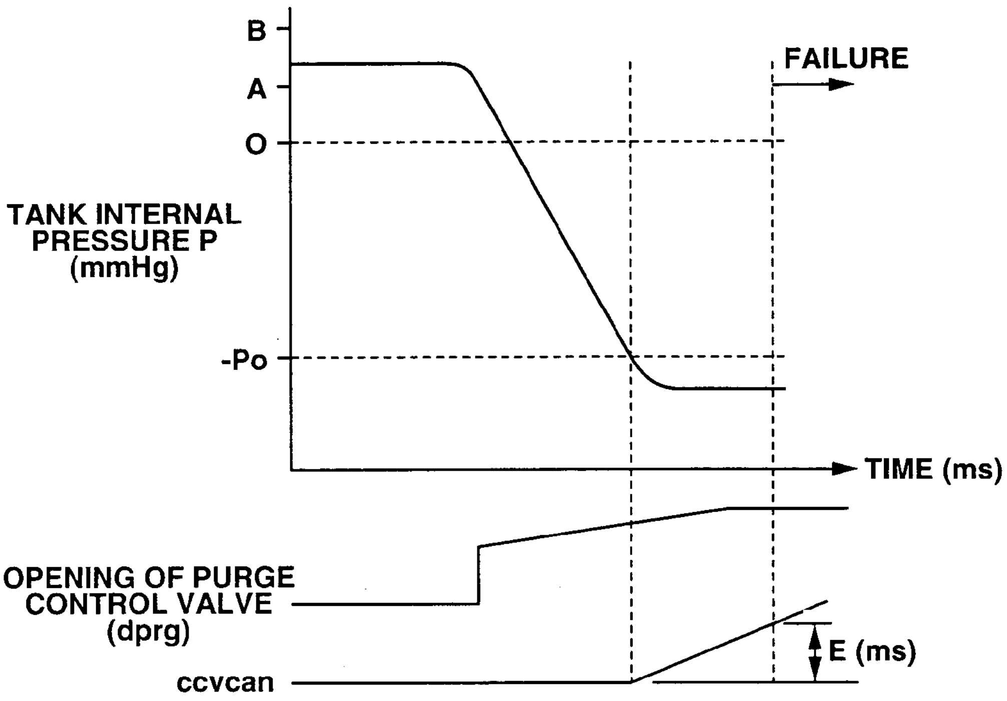
FIG. 5 is an explanation to show a relationship between the tank internal pressure, an opening of the purge control valve and a failure measurement timer.

FIG. 5 shows the relationship between the tank internal pressure P, the opening of the purge control valve 20, and the failure measurement timer ccvcan.

When the purge control valve 20 is opened, and the diagnosis execution condition is satisfied, the negative pressure generated in the air intake passage 2 on the downstream side of the throttle valve 5 is introduced in the canister 14 via the purge passage 19. In this state, if the drain valve 16 is close-stuck, the negative pressure introduced in the canister 14 is introduced in the reference pressure chamber 15*b* of the pressure control valve 15 via the atmosphere channel 31, and the diaphragm 23 is attracted. Then, the valve element 24 fixed to the diaphragm 23 is opened, the negative pressure is introduced in the fuel tank 11 via the evaporative gas passage 13, and the tank internal pressure P is gradually dropped.

When the tank internal pressure P decreases below the preset negative pressure −Po, the counting of the failure measurement timer ccvcan is started, the increment of the failure measurement timer ccvcan is given for each operation period. It determines the failure when the value of the failure measurement timer ccvcan reaches the failure determination time E[ms].

The routine to check that the drain valve 16 shown in FIG. 4 is normal is executed during the normal evaporative gas purge control.

In this routine, it first checks whether or not the purge execution condition is satisfied in step S11, i.e., whether or not the evaporative gas purge control is underway, and the purge execution condition is not satisfied, i.e., if the evaporative gas purge control is stopped, jumps to step S14, clears a regular measurement timer ccvprgc which will be described below (ccvprgc←0), and skips the routine.

On the other hand, if the purge execution condition is satisfied, i.e., if the evaporative gas purge control is underway, it goes to step S12. It determines a fuel temperature condition in step S12. In this step S12, it reads the temperature of a fuel stored in the fuel tank 11 (the fuel temperature) TF (° C.) which is measured by the fuel temperature sensor 27, and compares the fuel temperature TF with a preset lower limit set value C (° C.) and an upper limit set value D (° C.). If TF≦C or D≦TF, it jumps to step S14, clears the regular measurement timer ccvprgc which will be described below (ccvprgc←0), and skips the routine. On the other hand, if C<TF<D, go to step S13.

If the fuel temperature TF is low, the evaporative fuel is less generated. If the fuel temperature TF is high, the evaporative fuel is more generated. The detection accuracy is degraded if it is checked under these conditions whether or not the drain valve 16 is normal. Accordingly, the diagnosis is performed only when the fuel temperature TF is between the lower limit set value C and the upper limit set value D. The lower limit set value C and the upper limit set value D are set by obtaining an optimum temperature range to detect a normal state of the drain valve 16 from the experiment or the like.

Next, it goes to step S13. It reads the intake manifold pressure PIN which is the pressure difference between the atmospheric pressure measured by the intake manifold pressure sensor 18 and the absolute pressure of the intake manifold (the relative pressure), and compares the intake manifold pressure PIN, with the drain valve normality determination pressure G. If G>PIN, it goes to step S14, clears a regular measurement timer ccvprgc which will be described below (ccvprgc←0), and skips the routine. If G≧PIN, it goes to step S15.

The drain valve normality determination pressure G is obtained on the basis of the relationship between the tank internal pressure P and the intake manifold pressure PIN from the experiment or the like in advance, and set to a value capable of obtaining an excellent detection accuracy. In other words, if the absolute pressure of the intake manifold is high, the tank internal pressure P is less reduced during the evaporative gas purge control, and the detection accuracy in the normal state is degraded. Accordingly, no diagnosis is performed if the intake manifold pressure (relative pressure) PIN is low.

Then, it goes to step S15, and makes the increment of the regular measurement timer ccvprgc (ccvprgc←ccvprgc(−1) +1, where, ccvprgc(−1) is a previous value).

Then, it goes to step S16, and compares the value of the regular measurement timer ccvprgc with the normality determination time F. If ccvprgc<F, it skips the routine. If ccvprgc≧F, it goes to step S17, and compares the tank internal pressure P with a preset negative pressure −Po. If P≦−Po, it skips the routine, while, if P>−Po, it goes to step S18.

When the negative pressure introduced in the fuel tank 11 is dropped to some degree, detection errors in the value of the tank internal pressure P detected by the fuel tank pressure sensor 12 are increased under the influence of noises or the like, and wrong diagnosis often occurs. In the present embodiment, it skips the routine directly to allow the regular measurement timer ccvprgc to be in a waiting condition if the tank internal pressure P is lower than the preset negative pressure −Po (P≦−Po) in order to prevent any wrong determination in such a state. If P>−PO, the detection accuracy is enhanced by re-starting the increment of the regular measurement timer ccvprgc.

In the above case, the preset negative pressure −Po is set to be the same value employed in the routine to check any failure of the drain valve 16 shown in FIG. 3. However, the preset negative pressure −Po may be set to be different from the value employed in the routine in FIG. 3.

Then, it goes to step S18 to check whether or not the diagnosis execution condition is satisfied. It checks whether or not this diagnosis execution condition satisfies all conditions in steps S1 to S3 of the routine to check any failure of the drain valve 16 shown in FIG. 3. If the diagnosis execution condition is not satisfied, it skips the routine directly. Also, in this case, the value of the regular measurement timer ccvprgc is in the waiting condition similar to the above. On the other hand, if it is determined that the diagnosis execution condition is satisfied, it determines that the drain valve 16 is normally operated, goes to step S19, performs the normality determination processing, and skips the routine.

The normality determination processing executed in step S19 clears a failure determination flag (not shown) to be referred to, for example, when performing failure diagnosis, it enables the evaporative gas purge control, and performs the failure diagnosis of the evaporative gas purge system.

Figure 6:
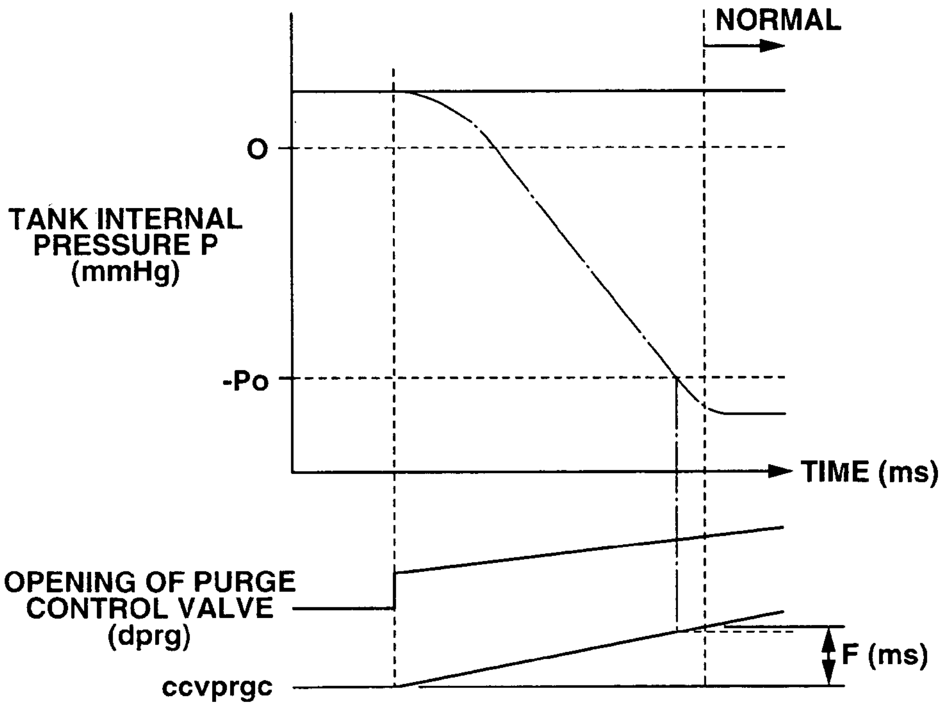
FIG. 6 is the explanation to show the relationship between the tank internal pressure, the opening of the purge control valve and a normality measurement timer.

FIG. 6 shows the relationship between the tank internal pressure P, the opening of the purge control valve 20, and the regular measurement timer ccvprgc.

When the purge execution condition is satisfied, and the purge control valve 20 is opened, the negative pressure generated in the air intake passage 2 on the downstream side of the throttle valve 5 is introduced in the canister 14 via the purge passage 19. If the drain valve 16 is normally opened, the atmospheric fresh air is introduced into the canister 14 from the fresh air introducing port **14*b*, and the evaporative fuel adsorbed in the activated charcoal 14*a* is sucked to the air intake passage 2 and burned. In addition, the atmospheric air is introduced in the reference pressure chamber 15*b* of the pressure control valve 15 via the atmosphere passage 31 communicated with the canister 14, and the valve element 24 fixed to the diaphragm 23 is opened by the pressure difference between the tank internal pressure P applied to the valve chamber 15*a* and the resultant pressure of the atmospheric pressure introduced into the reference pressure chamber 15*b* and the spring force of the diaphragm spring 26**, and the tank internal pressure P is regulated to be a constant value.

Clocking of the regular measurement timer ccvprgc is started synchronously with an opening of the purge control valve 20, the increment of the regular measurement timer ccvprgc is given for each operation period, and a normality is determined when the value of the regular measurement timer ccvprgc reaches the F[ms]. On the other hand, as shown by a one-dot chain line in FIG. 6, when the tank internal pressure P decreases below the preset negative pressure −Po, the regular measurement timer ccvprgc stops the increment in a waiting condition as shown by a broken line.

As described above, in the present embodiment, the failure diagnosis to check the presence of the closed sticking of the drain valve 16 and the diagnosis to check the normal operation of the drain valve 16 are separately performed from the regular failure diagnosis to perform the leak determination of the evaporative gas purge system. Therefore, when performing the regular failure diagnosis, the judgement accuracy of the regular failure diagnosis can be relatively enhanced since it is checked that the drain valve 16 is normally operated.

In other words, if the drain valve 16 is close-stuck, the pressure control valve 15 is opened during the evaporative gas purge control as described above, and the tank internal pressure P tends to be negative. Accordingly, in the regular failure diagnosis to perform the leak determination of the evaporative gas purge system, the quantity of the evaporative fuel is small, the pressure in the evaporative gas purge system is not fully raised, and it is difficult to correctly detect the presence of any evaporative fuel leakage. However, since the failure or the normality of the drain valve 16 is performed in advance separately from the leak determination of the evaporative gas purge system, the regular failure diagnosis can be performed with a high accuracy.

The present invention is not limited to the above-described embodiments. For example, in a closed sticking determination routine of the drain valve 16 shown in FIG. 4, and the normality determination routine of the drain valve 16 shown in FIG. 5, the specific delay times ccvcan and ccvprgc are provided when determining the closed sticking of the drain valve 16 or the normality. If the detection accuracy is guaranteed to some degree, the delay times ccvcan and ccvprgc may be omitted.

Having described the preferred embodiments of the invention referring to the accompanying drawings, it should be understood that the present invention is not limited to those precise embodiments and various changes and modifications thereof could be made by one skilled in the art without departing from the spirit or scope of the present invention as defined in the appended claims.

What is claimed is:

1. A failure diagnostic device of an evaporative gas purge control system, comprising:

an evaporative gas passage to communicate a fuel tank with a canister to adsorb an evaporative fuel generated in the fuel tank;

a purge passage to communicate the canister with an engine intake system;

a pressure control valve interposed in the evaporative gas passage and opened at a valve opening according to a pressure difference between the pressure in the fuel tank and a reference pressure if the pressure in the fuel tank is higher than the reference pressure;

a reference pressure chamber to set the reference pressure of the pressure control valve connected to the canister;

purge control means interposed in the purge passage to control an opening and a closing of the purge passage;

a drain valve to open and close a fresh air introducing port opened in the canister; and tank internal pressure detecting means to detect the pressure in the fuel tank;

diagnosis start means to detect that the drain valve is opened from an energized state to the drain valve, and open the purge control means; and failure determination means to compare the pressure in the fuel tank detected by the tank internal pressure detecting means with a closed sticking determination pressure of the drain valve, and to determine a closed sticking of the drain valve if the pressure in the fuel tank is lower than the closed sticking determination pressure of the drain valve.

2. The failure diagnostic device according to claim 1, wherein;

the failure determination means determines the closed sticking of the drain valve if the pressure in the fuel tank is lower than the closed sticking determination pressure of the drain valve and a state thereof is maintained for a predetermined time.

3. A failure diagnostic device of an evaporative gas purge control system, comprising:

an evaporative gas passage to communicate a fuel tank with a canister to adsorb an evaporative fuel generated in the fuel tank;

a purge passage to communicate the canister with an engine intake system;

a pressure control valve interposed in the evaporative gas passage and opened at a valve opening according to the pressure difference between the pressure in the fuel tank and a reference pressure if the pressure in the fuel tank is higher than the reference pressure;

a reference pressure chamber to set the reference pressure of the pressure control valve connected to the canister;

purge control means interposed in the purge passage to control an opening and a closing of the purge passage;

a drain valve to open and close a fresh air introducing port opened in the canister; and a tank internal pressure detecting means to detect the pressure in the fuel tank;

purge execution means to purge the evaporative fuel by opening the purge control means and the drain valve; and failure determination means to determine that the drain valve is normal if the pressure in the fuel tank detected by the tank internal pressure detecting means while purging the evaporative fuel is higher than a drain valve normality determination pressure.

4. The failure diagnostic device according to claim 3, wherein;

the failure determination means determines that the drain valve is normal if the pressure in the fuel tank is higher than the drain valve normality determination pressure and a state thereof is maintained for a predetermined time.

* * * * *